United States Patent [19]
Gonyea

[11] Patent Number: 5,706,860
[45] Date of Patent: Jan. 13, 1998

[54] METHOD AND APPARATUS FOR PROTECTING AND MANIPULATING PIPE ENDS

[75] Inventor: John M. Gonyea, Tomball, Tex.

[73] Assignee: Bunzl Plastics, Inc., St. Louis, Mo.

[21] Appl. No.: 620,045

[22] Filed: Mar. 21, 1996

[51] Int. Cl.⁶ .................................................. B65D 57/00
[52] U.S. Cl. .................. 138/96 T; 138/96 R; 138/89; 220/337
[58] Field of Search .................. 138/96 T, 96 R, 138/89, 89.1–89.4, 109; 251/351; 220/266, 281, 339, 259, 337, DIG. 33; 215/235, 301

[56] References Cited

U.S. PATENT DOCUMENTS

| | | | |
|---|---|---|---|
| 1,491,325 | 4/1924 | Thomas, Jr. . | |
| 1,600,860 | 9/1926 | Young | 138/96 T |
| 1,749,162 | 3/1930 | Scott | 138/96 T |
| 1,860,886 | 5/1932 | Brownstein | 138/96 T |
| 2,092,535 | 9/1937 | Schnorr | 138/96 T |
| 2,098,087 | 11/1937 | Engstrom | 138/96 T |
| 2,223,202 | 11/1940 | Bergan | 138/96 T |
| 2,385,408 | 9/1945 | Engstrom | 138/96 T |
| 2,503,031 | 4/1950 | Davidson | 220/337 |
| 2,942,625 | 6/1960 | Costanzo | 138/96 R |
| 3,327,379 | 6/1967 | Clements | 138/96 R |
| 4,060,100 | 11/1977 | Miller et al. . | |
| 4,139,005 | 2/1979 | Dickey . | |
| 4,337,799 | 7/1982 | Hoover . | |
| 4,473,167 | 9/1984 | Bailey . | |
| 4,483,371 | 11/1984 | Susin . | |
| 5,273,177 | 12/1993 | Campbell . | |

FOREIGN PATENT DOCUMENTS

1696811-A1  12/1991  U.S.S.R. .

Primary Examiner—Patrick Brinson
Attorney, Agent, or Firm—Oliff & Berridge plc

[57] ABSTRACT

A pipe end protector includes a protector body having a shape substantially matching that of a pipe end and at least one knock-out formed integrally with the protector body. The at least one knock-out has a peripheral edge having a first portion connected to the protector body by a hinge and is deflectable from the protector body. The at least one knock-out remains attached to the protector body while hingedly deflecting from the protector body about the hinge.

18 Claims, 6 Drawing Sheets

5,706,860

METHOD AND APPARATUS FOR PROTECTING AND MANIPULATING PIPE ENDS

BACKGROUND OF THE INVENTION

1. Field of the Invention

This invention relates to pipe end protectors, and more particularly to a threaded pipe end protector capable of both preventing moisture and other contaminants from entering a pipe and allowing a lifting device access to the pipe. A method is also disclosed for protecting and manipulating a pipe end.

2. Background of Related Art

It is known in the pipe manufacturing and handling industry to use pipe end protectors to protect pipe ends from damage. Specifically, threaded pipe ends are particularly susceptible to damage due to rust and/or impact from handling equipment, other pipes, the ground, storage racks, or the like.

An example of a prior art threaded pipe end protector is found in U.S. Pat. No. 4,337,799, which discloses a plastic thread protector with an opening in its end wall structure through which a handling hook may be inserted.

However, the above-mentioned type of protector cannot prevent moisture and other contaminants from entering the pipe. Pipes are often left in outdoor storage facilities, sometimes for extended periods of time during which the pipes may be subjected to rainfall, dust or debris blown by the wind, or attempted entry by rodents, birds, or other wildlife. A pipe end protector is therefore desirable that can prevent entry of such unwanted items into a pipe.

Soviet Union patent publication No. 1696811-A1 discloses a pipe end guard in the shape of a cylindrical cup that is clamped onto the end of a pipe. An aperture is provided in the cup to allow a handling hook to be inserted into the pipe end. After handling, a shutter is placed over the aperture and clamped, along with the cylindrical cup, to the pipe end, thus effectively closing the pipe end. However, this structure is troublesome to manage because it involves three separate elements: namely, the cylindrical cup, the band clamp, and the shutter.

U.S. Pat. No. 4,060,100 discloses a cylindrical pipe closure with an attached cap that may be removed and replaced. However, this closure is designed for infrequent use, i.e., twice a year, when valves are turned on and off, and would not stand up to the rigorous conditions of pipe handling. For example, the plastic bridge which attached the cap to the closure would be easily broken and the cap easily lost.

SUMMARY OF THE INVENTION

It is thus an object of the present invention to provide a pipe end protector that allows a handling device to be inserted for handling a pipe end, and which may be easily closed to prevent water and other contaminants from entering the pipe.

Another object is to provide protection for the threads of a threaded pipe end.

Another object is to provide a pipe protector which may be easily gripped by hand for tightening or loosening, and which also may be engaged by a torque applying device for tightening or loosening.

According to one aspect of the invention, there is provided a pipe end protector having a body with a shape substantially matching that of a pipe end and at least one knock-out formed integrally with the protector body. The knock-out has a peripheral edge with a first portion connected to the protector body by a hinge, and is deflectable from the protector body about the hinge. The knock-out remains attached to the protector body while hingedly deflecting from the protector body.

In a preferred embodiment of the invention, the hinge is a living hinge.

According to another aspect of the invention, there is provided a pipe end protector for protecting the pipe end from damage and for preventing moisture and other contaminants from entering the pipe through the pipe end. The pipe end protector includes a body, an end wall connected to the body, at least one knock-out movable between a closed position parallel to the end wall and at least one open position different from the closed position, and structure for maintaining connection between the knock-out and the end wall in the opened and closed positions.

According to another aspect of the invention, there is provided a protector for protecting a pipe end having a body that is connectable to the pipe end, an end wall connected to the body, and structure for selectively permitting access to an interior portion of the pipe end while the body engages the pipe end. The shape of the end wall substantially matches the shape of the pipe end.

According to another aspect of the invention, there is provided a method for protecting and manipulating a pipe end. The method includes covering a pipe end with a protective body, providing at least one knock-out in the protective body that is movable between open and closed positions, deflecting the knock-out to an open position, thereby forming an opening, and inserting a pipe-manipulating device into the pipe end through the opening to manipulate the pipe end. Attachment is maintained between the knock-out and the protective body while the knock-out is deflected.

In a preferred embodiment, the method also includes removing the pipe-manipulating device from the opening and closing the opening by deflecting the knock-out from the open position to the closed position.

BRIEF DESCRIPTION OF THE DRAWINGS

These and other objects, advantages and salient features of the invention will become apparent to those skilled in the art from the following detailed description of preferred embodiments taken in conjunction with the drawings in which.

DETAILED DESCRIPTION OF PREFERRED EMBODIMENTS

Figure 1:
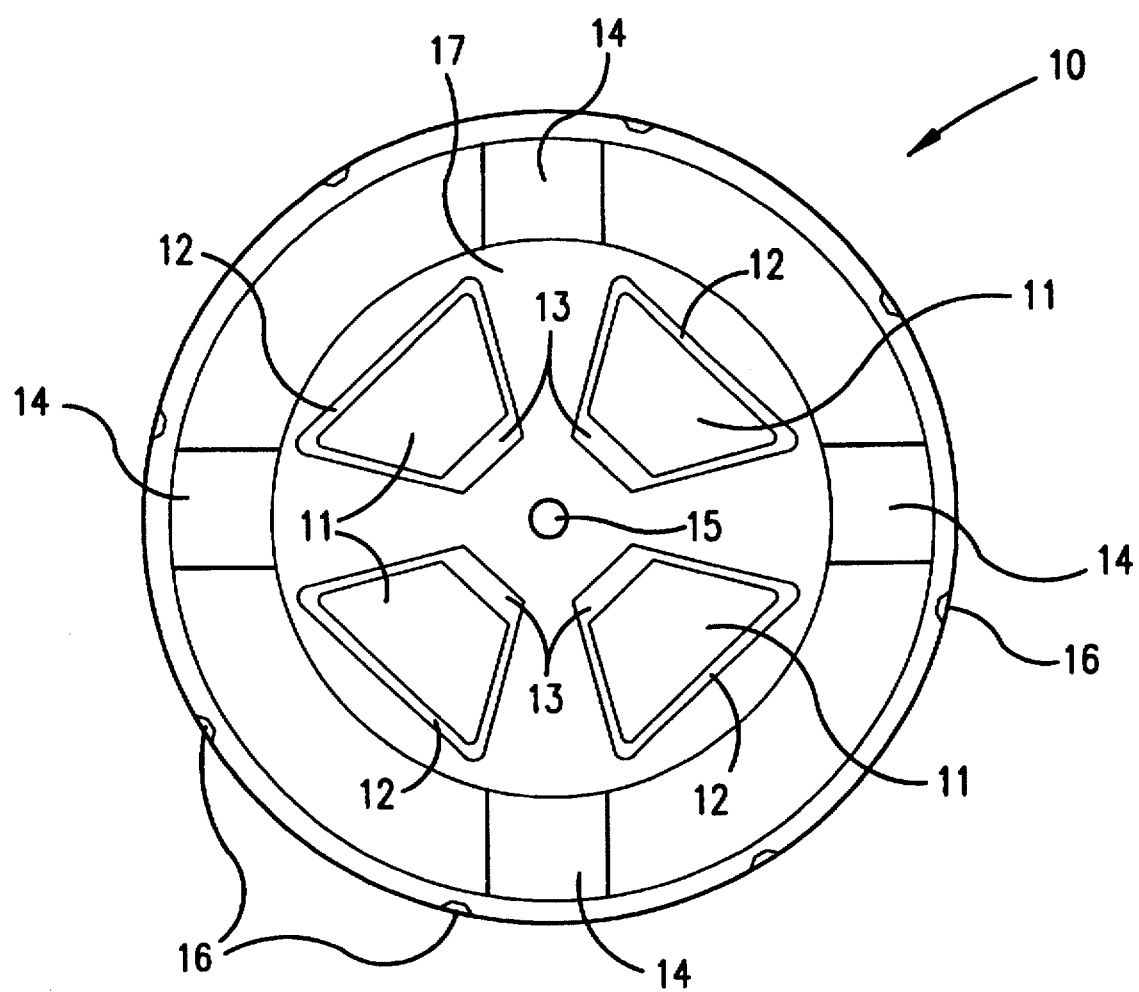
FIG. 1 illustrates a plan view of the pipe end protector of the present invention.

FIG. 1 shows a pipe end protector 10 for protecting threaded pipe ends. The pipe end protector 10 is, for example, molded from polymeric material, and has knock-outs 11 formed in an end wall 17 of the protector 10. The knock-outs 11 are, for example, trapezoidal in shape and are spaced equally about the axis of the protector. Other shapes, such as rectangular, circular, or triangular, are also within the scope of the present invention. Frangible webbing 12 connects the knock-out 11 to the end wall 17 on three sides of the knock-out 11, while a hinge, for example a living hinge, 13 connects the knock-out to the end wall on the fourth side.

The frangible webbing 12 and the hinge 13 can be formed from the same polymeric material as are the knock-outs 11 and the end wall 17. The frangible webbing 12 and living hinge 13 are integrally molded with the knock-outs and end wall, but have thicknesses less than the thicknesses of the knock-outs and end wall, thereby providing lines of weakness along which the knock-outs 11 may be separated and deflected from the end wall 17.

A vent hole 15 is provided in the end wall 17 to allow any air pressure inside the pipe to equalize with ambient air pressure.

Figure 3:
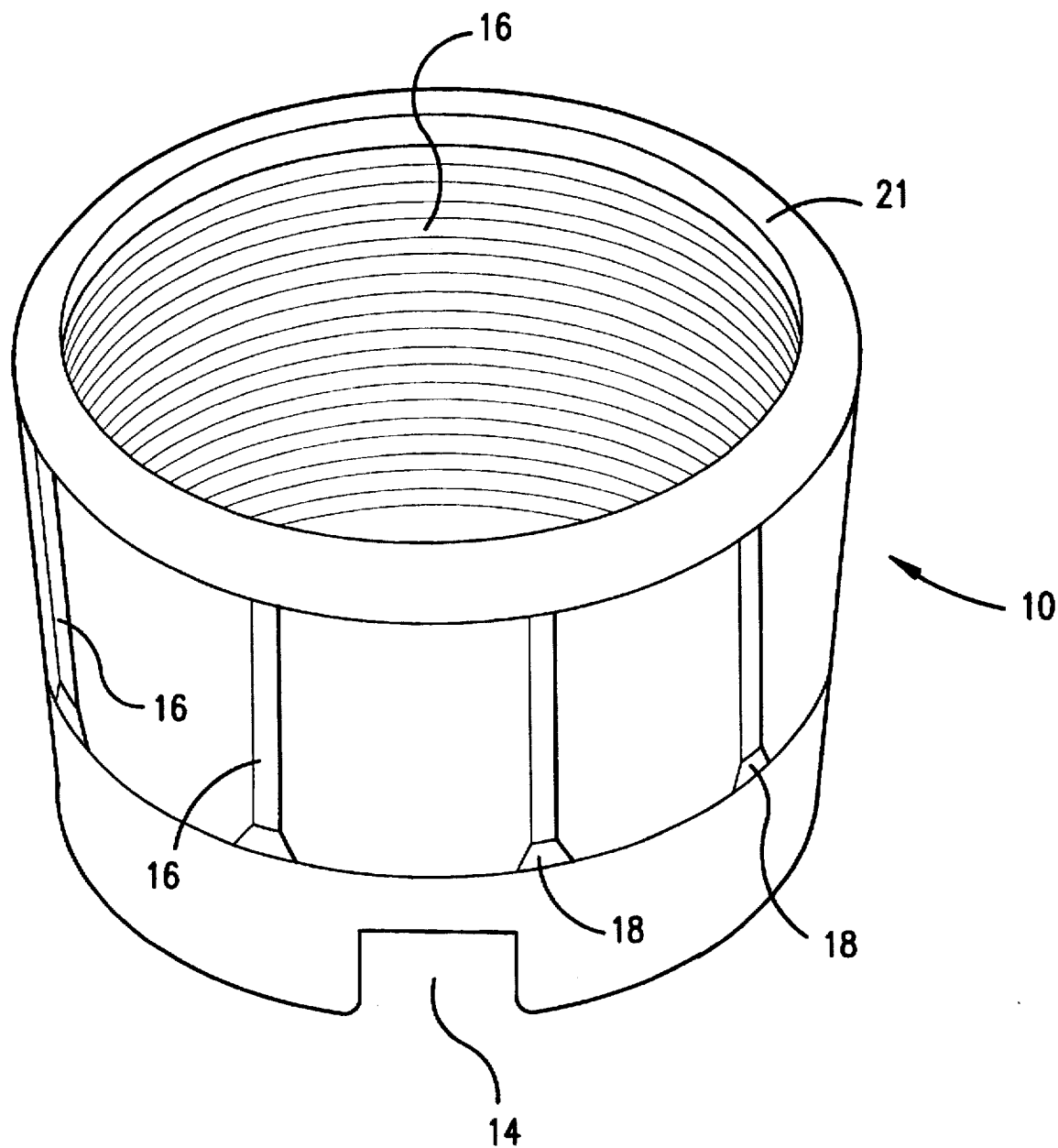
FIG. 3 illustrates a bottom isometric view of the pipe end protector.
Figure 4:
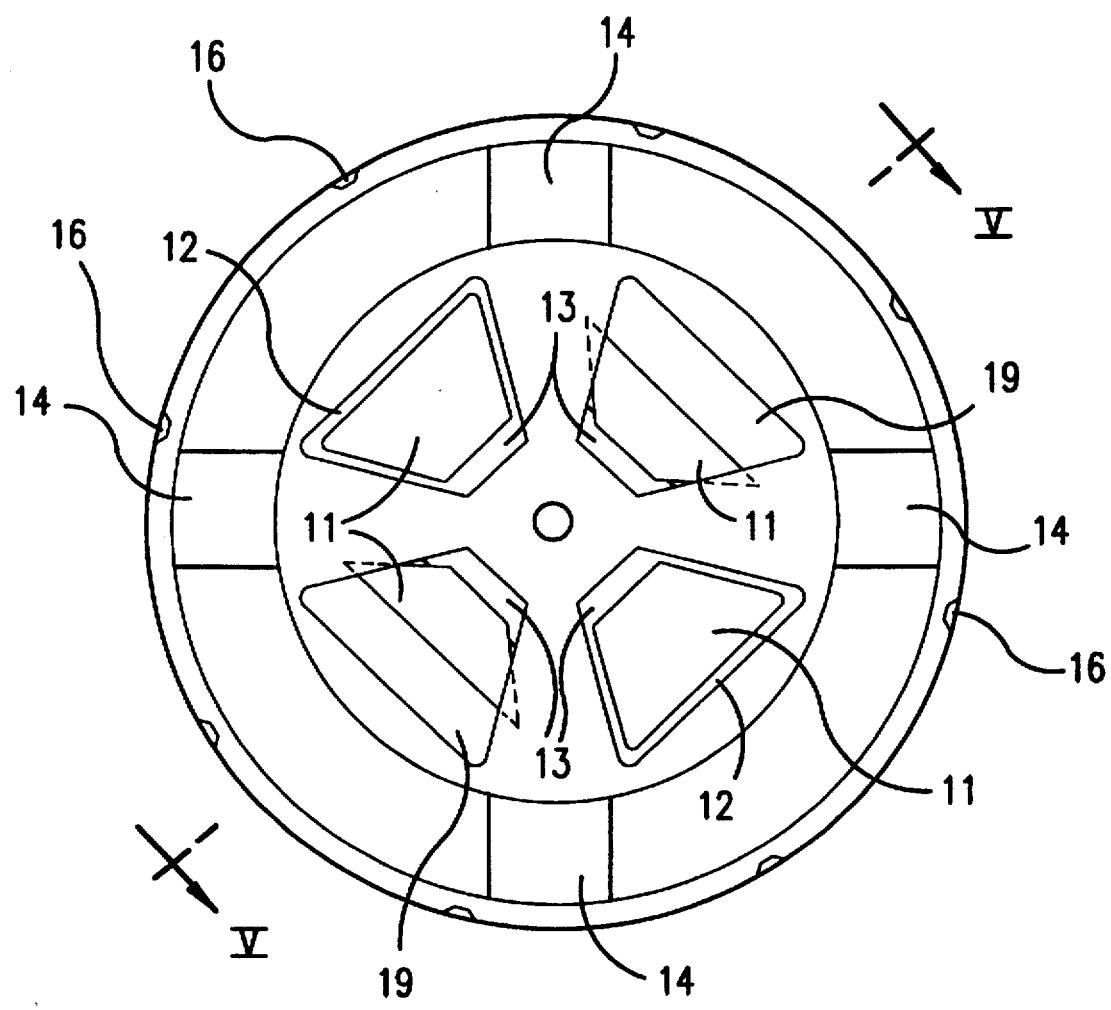
FIG. 4 illustrates a plan view of the pipe end protector showing a portion of the knock-outs in an open position.
Figure 5:
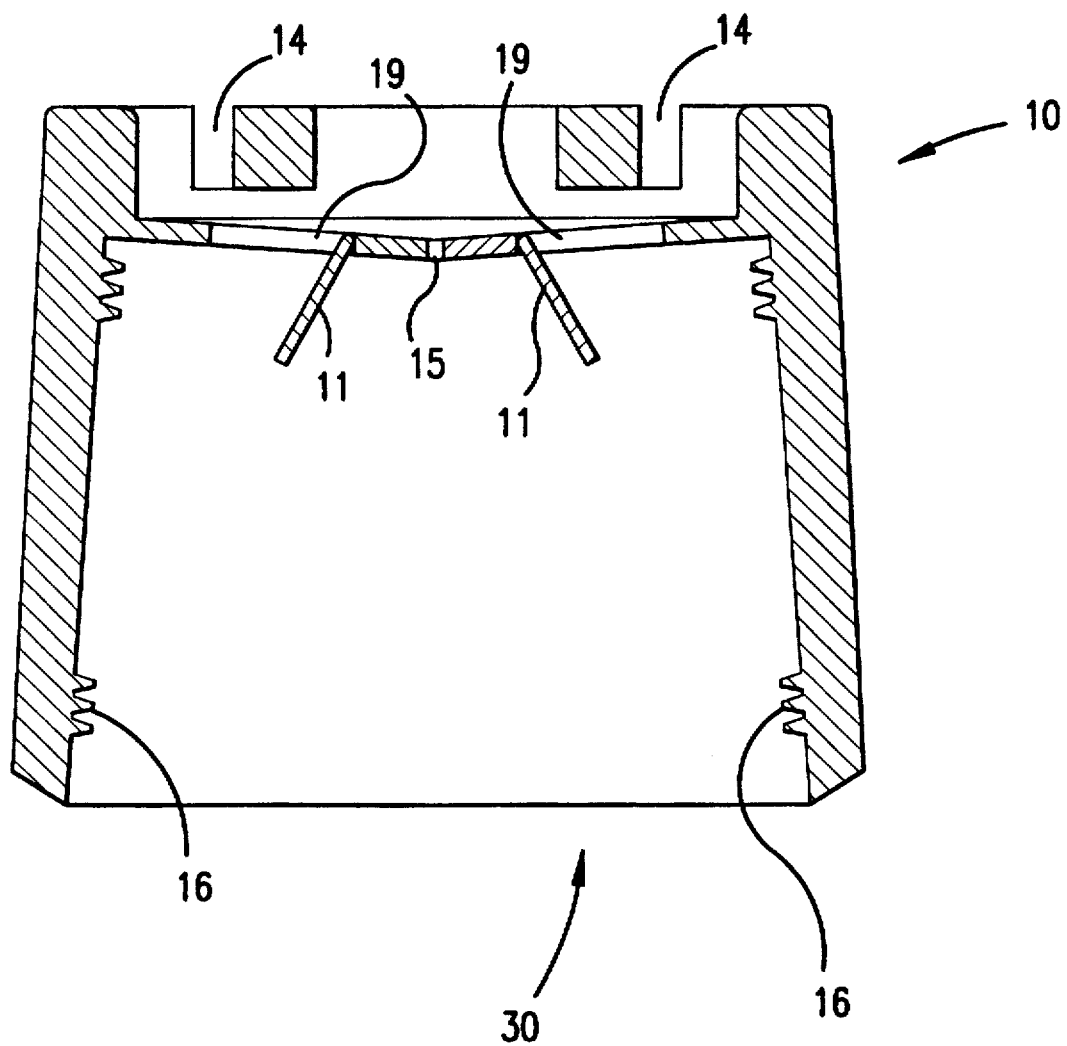
FIG. 5 illustrates a cross-sectional view through the line V—V of FIG. 4.
Figure 6:
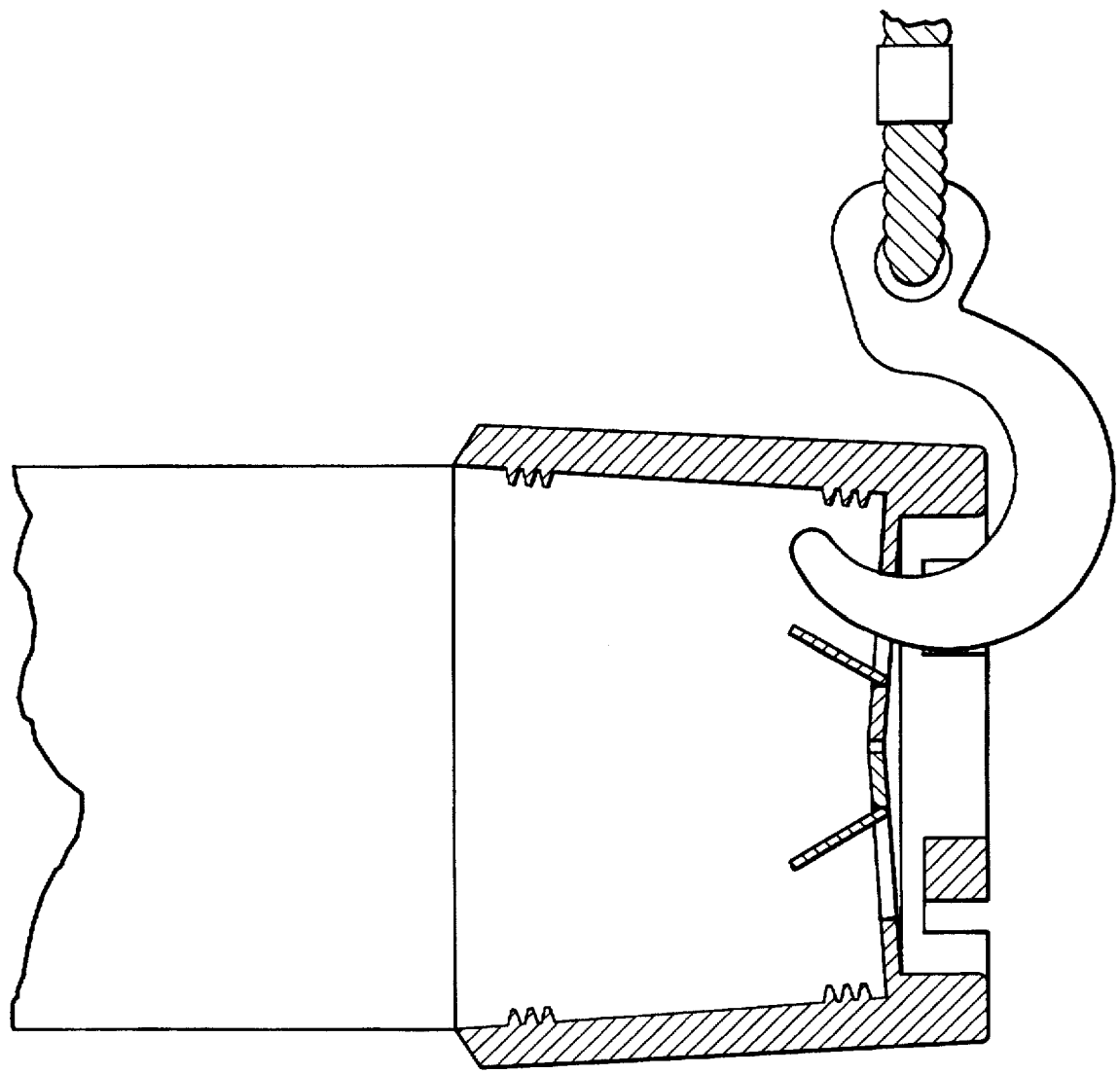
FIG. 6 illustrates a pipe-manipulating device inserted through an end wall of the pipe end protector.

FIG. 3 shows the interior of the pipe end connector. A threaded portion 25 is provided for allowing the protector 10 to be screwed onto a threaded pipe end.

Figure 2:
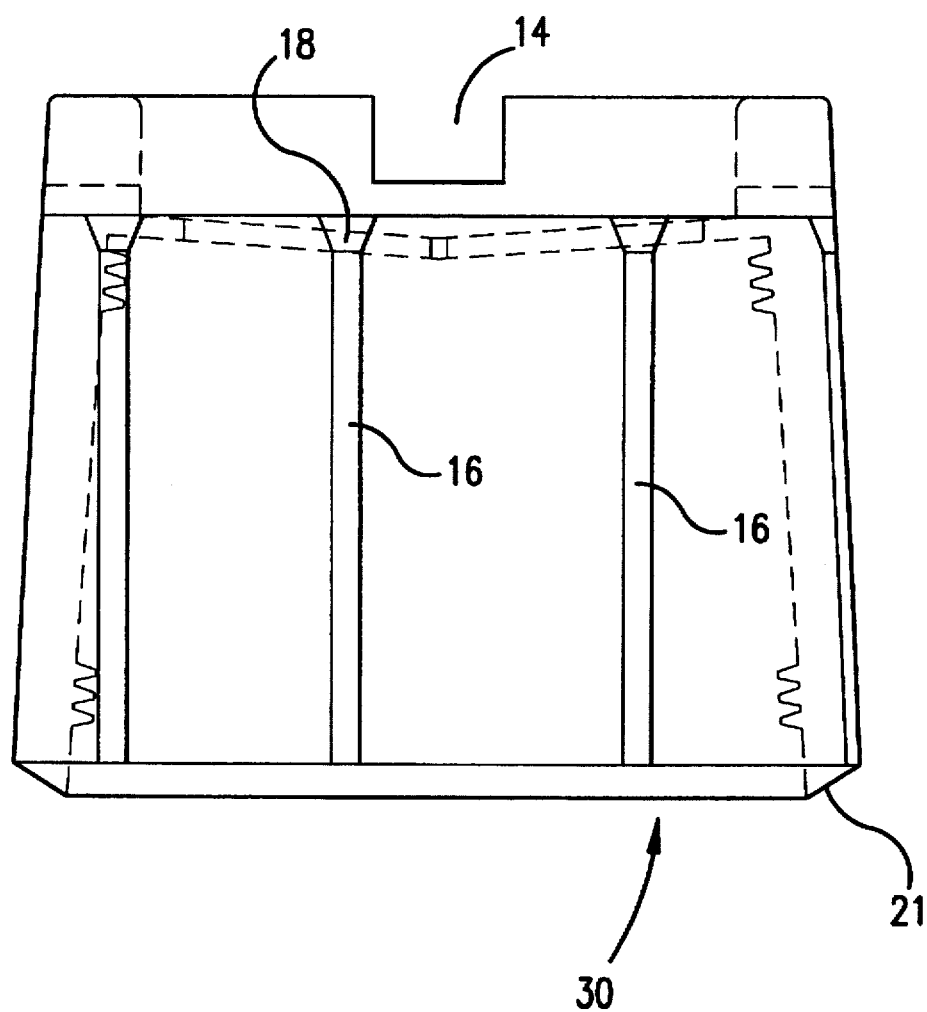
FIG. 2 illustrates a side view of the pipe end protector.

Notches 14 are shown in FIGS. 1–3. These notches are equally spaced about the axis of the protector 10, and allow a bar, wrench or other torque-applying device (not shown) to engage the protector 10 for tightening or loosening the protector with respect to the threaded pipe end. Grooves 16 are formed in the outer surface of the protector 10. These grooves 16 allow a user to better grip the protector 10 while manually tightening or loosening the protector 10. Sloped trapezoidal sections 18 provide smooth transitions from the grooves 16 to the outermost surface of the protector 10, thereby facilitating manufacturing processes, for example.

A beveled surface 21 is provided on the open end 30 of the protector 10 to eliminate a square edge and to provide a smooth transition from the protector 10 to the pipe to which the protector 10 is attached. This elimination of a square edge provides a smoother profile to reduce the possibility of injury to a user, and also aids in the shedding of water and prevents water from accumulating between the protector 10 and the pipe end.

In order to insert a handling device, such as a crane hook or the like, through the pipe end protector 10 and into the pipe, one or more of the knock-outs 11 is deflected from the protector end wall 17 along the frangible webbing 12. This is accomplished by striking the knock-out with a hammer, punch, or other instrument, or by applying firm pressure to the knock-out in the areas adjacent to the frangible webbing 12 until the frangible webbing breaks and the knock-out deflects.

After the frangible webbing has been broken, the knock-out remains attached to the protector end wall 17 by the living hinge 13. It is advantageous for the knock-out to remain attached because, among other reasons, the knock-out will not fall into the interior of the pipe and become annoying clutter that is potentially damaging to pipes, valves, and the like if not removed prior to assembly or installation of the pipe.

When the knock-out has been deflected by breaking the frangible webbing 12, the crane hook or other handling device is inserted into the pipe end through the opening 19 left by the knock-out 11. The pipe end may then be lifted and/or manipulated by the crane or other handling device.

After the pipe end has been lifted and/or moved to a desired location and the crane hook has been removed, it is often desirable to reclose the pipe end to prevent moisture and other contaminants from entering the pipe. When the pipe end protector is removed from the pipe end, the deflected knock-out 11 may be pressed from the open end 30 of the protector back into the opening 19 where it remains by frictional engagement. The pipe end closing capability of the protector is thus restored and the protector may then be rethreaded onto the original pipe end or reused on a different pipe end.

The invention has been described with reference to its preferred embodiments, which are intended to be illustrative and not limiting. For example, the invention has been described with reference to male or exterior threaded pipe ends, but could easily be adapted to apply to female or interior threaded pipe ends. Furthermore, the invention could be adapted to apply to unthreaded pipe ends by means of a friction fit or a band clamp-type connection. Other materials, such as elastomeric materials, are also within the scope of the disclosed pipe end protector. Thus, variations and modifications may be made without departing from the spirit and scope of the invention as defined in the appended claims.

What is claimed is:

1. A pipe end protector, comprising:
   a protector body having a shape substantially matching that of a pipe end; and
   at least one knock-out formed integrally with the protector body, the at least one knock-out having a peripheral edge having a first portion connected to the protector body by a hinge and a second portion initially connected to the body by frangible webbing, the knock-out being deflectable from the protector body about the hinge;
   wherein, when the protector is attached to the pipe end, the frangible webbing can be broken away from attachment with the body and the at least one knock-out remains attached to the protector body while hingedly deflecting from the protector body about the hinge.

2. The pipe end protector according to claim 1, wherein the at least one knock-out is returnable to an original position with respect to the protector body.

3. The pipe end protector according to claim 1, wherein the protector body is generally cylindrical in shape.

4. The pipe end protector according to claim 1, further comprising a threaded portion capable of engaging threads on the pipe end.

5. The pipe end protector according to claim 1, further comprising at least one grooved portion formed on an outer surface and substantially parallel to a longitudinal axis of the protector body.

6. The pipe end protector according to claim 1, wherein a plurality of notches are formed in the protector body for accommodating a torque-applying device.

7. The pipe end protector according to claim 1, wherein the hinge is a living hinge.

8. The pipe end protector according to claim 1, wherein the protector body and the at least one knock-out are integrally formed of molded polymeric material.

9. The pipe end protector according to claim 1, wherein at least one vent hole is formed in a wall of the protector body adjacent the at least one knock-out.

10. The pipe end protector according to claim 1, wherein the protector body and the at least one knock-out are formed as one piece.

11. A pipe end protector for protecting a pipe end from damage and for preventing moisture and other contaminants from entering a pipe through the pipe end, comprising:

a body;

an end wall connected to the body and positionable adjacent the pipe end;

a plurality of knock-outs formed in the end wall, each knock-out being movable between a closed position parallel to the end wall and at least one open position different from the closed position while the end wall is positioned adjacent the pipe end, the at least one open position being a position in which each knock-out hinges inward toward an interior portion of the pipe; and means for maintaining connection between each knock-out and the end wall in said open and closed positions.

12. The pipe end protector according to claim 11, further comprising thread-engaging means for engaging a threaded portion of the pipe end.

13. The pipe end protector according to claim 11, further comprising engaging means for engaging a torque-applying device.

14. The pipe end protector according to claim 11, further comprising grip-enhancing means to enhance manual gripping of the pipe end protector.

15. A protector for protecting a pipe end, comprising:

a body engageable with a pipe end;

an end wall connected to the body, the end wall having a shape substantially matching a shape of a pipe end; and access means formed entirely within a central portion of the end wall and attached to the end wall by a living hinge, the access means selectively permitting access to an interior portion of the pipe end through the end wall while the body engages the pipe end.

16. The pipe end protector according to claim 15, wherein the selective access-permitting means comprises a knock-out.

17. A method for protecting and manipulating a pipe end, the method comprising:

covering a pipe end with a protective body;

providing at least one knock-out portion in the protective body, the at least one knock-out portion being movable between a closed position and at least one open position being a position in which the knock-out hinges inward toward an interior portion of the pipe end;

deflecting the knock-out portion from the closed position to the at least one open position, thereby forming an opening in the protective body while maintaining attachment between the at least one knock-out portion and the protective body; and inserting a pipe-manipulating device into the pipe end through the opening to move the pipe end to a desired location.

18. The method for protecting and manipulating a pipe end according to claim 17, further comprising:

removing the pipe-manipulating device from the opening;

closing the opening by deflecting the at least one knock-out portion from the open position to the closed position.

* * * * *